United States Patent [19]
Schulman

[11] 3,948,541
[45] Apr. 6, 1976

[54] INFLATABLE BODY AND HEAD RESTRAINT

[75] Inventor: Marvin Schulman, Broomall, Pa.

[73] Assignee: The United States of America as represented by the Secretary of the Navy, Washington, D.C.

[22] Filed: June 23, 1975

[21] Appl. No.: 589,296

Related U.S. Application Data

[63] Continuation-in-part of Ser. No. 483,603, June 27, 1974, Pat. No. 3,905,615.

[52] U.S. Cl.... 280/150 AB; 244/122 B; 280/150 SB
[51] Int. Cl.² ......................................... B60R 21/10
[58] Field of Search ................ 280/150 AB, 150 SB; 244/122 R, 122 B; 9/342; 297/384–390; 2/DIG. 3

[56] References Cited
UNITED STATES PATENTS

| | | | |
|---|---|---|---|
| 3,218,103 | 11/1965 | Boyce | 280/150 SB |
| 3,345,657 | 10/1967 | Peeler et al. | 9/342 |
| 3,430,979 | 3/1969 | Terry et al. | 280/150 AB |
| 3,672,609 | 6/1972 | Hawkins | 9/342 |
| 3,682,498 | 8/1972 | Rutzki | 280/150 SB |
| 3,706,463 | 12/1972 | Lipkin | 280/150 AB |
| 3,771,183 | 11/1973 | Moran | 9/342 |
| 3,827,716 | 8/1974 | Vaughn | 280/150 AB |
| 3,865,398 | 2/1975 | Woll | 280/150 AB |

FOREIGN PATENTS OR APPLICATIONS

| | | | |
|---|---|---|---|
| 1,431,248 | 1/1969 | Germany | 244/122 B |

*Primary Examiner*—Kenneth H. Betts
*Attorney, Agent, or Firm*—R. S. Sciascia; Henry Hansen

[57] ABSTRACT

A vehicle occupant restraint system which includes a bladder member securely affixed to shoulder straps and a lap belt is disclosed. The bladder member comprises a central pocket portion in fluid communication with two pelvic bags and two chest bags. The chest bags are additionally interconnected with a chin bag member. Upon impact the bladder member automatically inflates to thereby cushion the pelvic and chest areas against the forces of the collision and simultaneously the chin bag member inflates to thereby prevent rotation of the vehicle occupant's chin into his chest.

4 Claims, 3 Drawing Figures

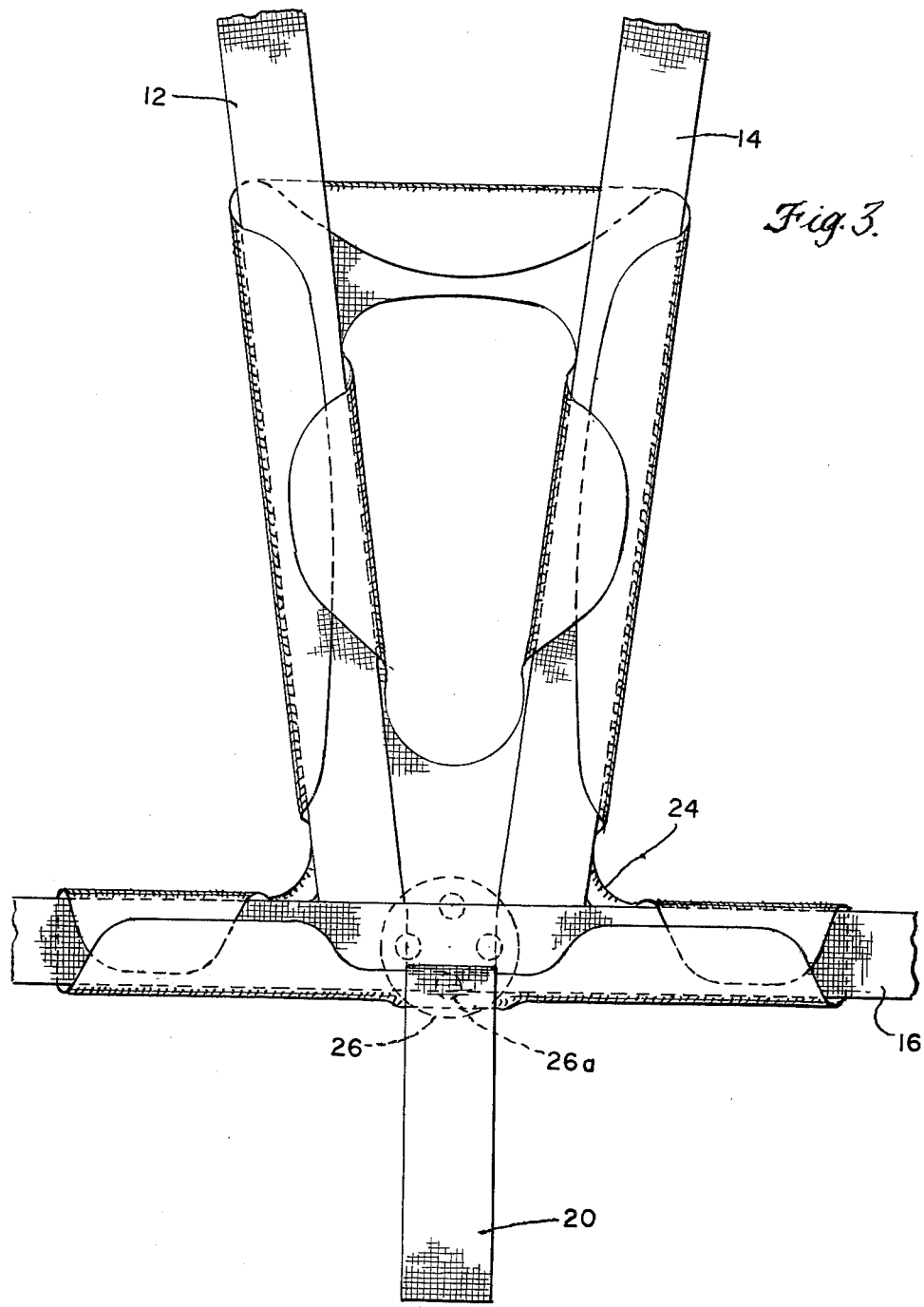

INFLATABLE BODY AND HEAD RESTRAINT

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATIONS

This is a continuation in part of application Ser. No. 483,603 filed on June 27, 1974 now U.S. Pat. No. 3,905,615.

BACKGROUND OF THE INVENTION

This invention relates to restraint systems for vehicle occupants and in particular to restraint systems which automatically inflate upon impact or collision.

Naval aviators normally wear a restraint during flight which is basically a lap belt and shoulder harness attached to a seat. During a crash the current restraint system may not be fully effective for the following reasons.

The restraint system may not have been completely tightened by the crewman when initially placed on and if worn loosely will allow a downward and forward motion of the crewman into his restraint during a crash. This motion results in the crewman experiencing high decelerative and strap loads as his velocity decreases to the velocity of the seat.

Depending on the severity of the crash, serious injury or death may result from the transfer of kinetic energy between the crewman and the restraint system. Under high crash forces, the crewman moves into his restraint, loading the straps to thousands of pounds. This load must be reacted by that part of his anatomy directly covered by the straps whose width is normally less than two inches. If the load applied to an anatomic structure exceeds its limit then that structure will fracture resulting in injury to the crewman.

The conventional restraint has been designed to limit torso motion. During a crash the upper torso is abruptly stopped in its forward motion as it loads the straps; however, the crewman's head and neck hyperflex and rotate violently forward until arrested by muscular involvement or by direct contact of the mandible and sternum. Serious injury or death may result from this forward whiplash motion. Although the exact mechanism causing injury is not well understood it is known that if the head is supported and restrained from whipping, the probability of injury will be reduced.

SUMMARY OF THE INVENTION

Accordingly, it is an object of this invention to provide a restraint device which includes means for minimizing forward whiplash of the head. It is a further object of this invention to provide a restraint system which inflates upon a threshold impact to form a buffer for the vehicle occupant, which compensates for any initial slack in the restraint harness and which tightens the vehicle occupant into his seat during the initial moments of a crash. It is a further object of this invention to provide an inflatable restraint system which is integrated with a strap restraining system in the uninflated or stowed condition and which is constructed for convenient ingress and egress. These and other objects of the invention are achieved as follows.

Two shoulder straps and a negative G-strap have their proximal ends securely affixed intermediate the ends of a lap belt. The distal ends of the lap belt and the shoulder straps are provided wih fittings which mate with conventional diconnect devices located on the crewman's seat. The distal end of the negative G-strap is formed to be affixed to the crewman's seat, e.g., at the forward central portion of the seat. The shoulder straps, lap belt and negative G-strap are securely affixed to a bladder member. The bladder member comprises a central pocket portion which is in fluid communication with two pelvic bags and two chest bags. The chest bags are additionally interconnected by a chin bag member. The central pocket portion of the inflatable bladder member houses a gas generator. Upon impact a sensor switch closes and supplies energy to fire the gas generator. The bladder member inflates virtually instantaneously as does the chin bag member to thereby cushion the pelvic and chest areas against the forces of the impact and to minimize or prevent head rotation into the chest area.

Other objects, advantages and novel features of the invention will become apparent from the following detailed description of the invention when considered in conjunction with the accompanying drawings.

BRIEF DESCRIPTION OF THE DRAWINGS

FIG. 3 shows the restraint system of FIGS. 1 and 2 in the uninflated and stowed state.

DESCRIPTION OF THE PREFERRED EMBODIMENT

Figure 1:
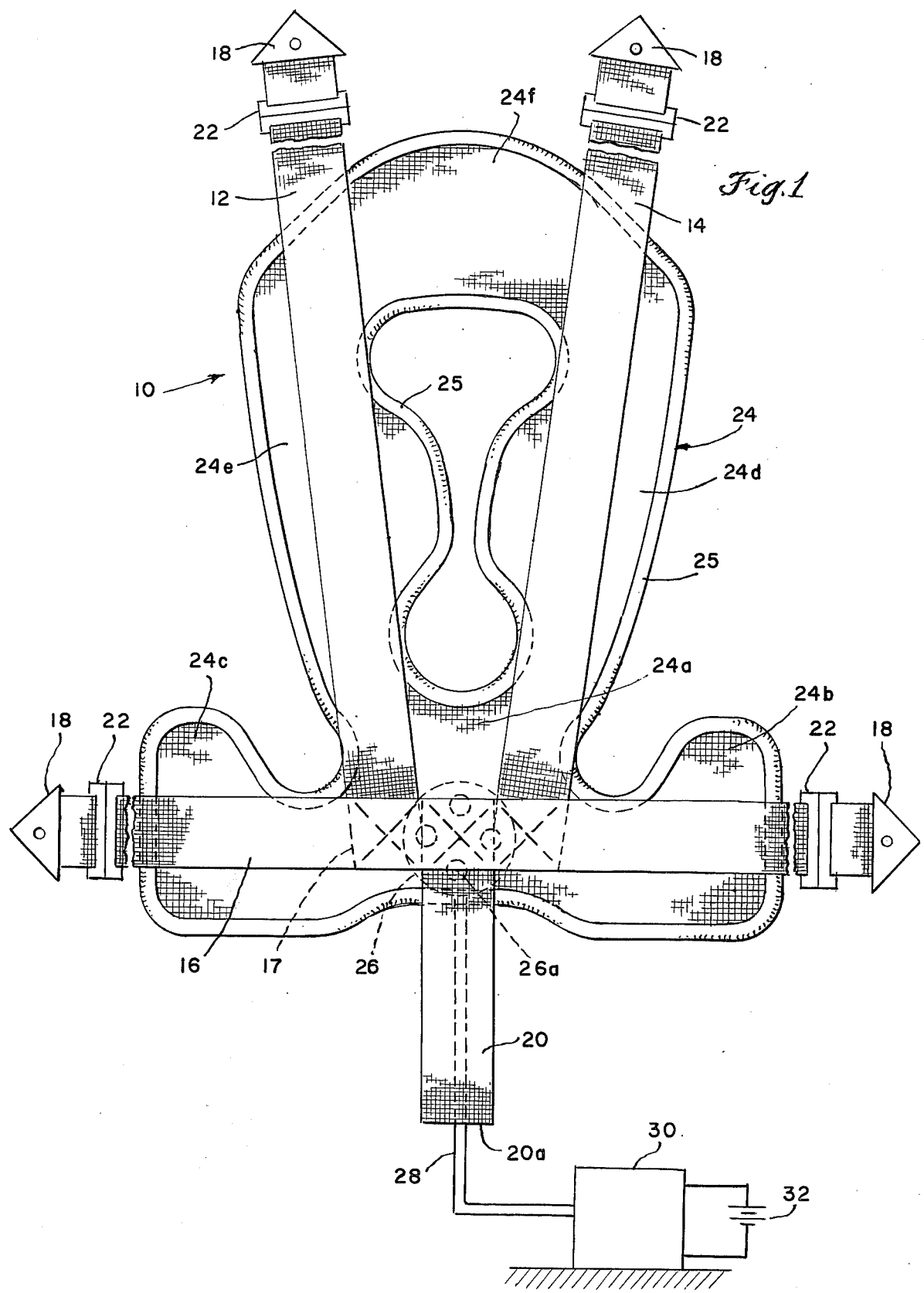
FIG. 1 shows a restraint system, according to the invention, in the uninflated state.

Referring to FIG. 1, the restraint system 10 of the present invention is shown in the uninflated state. It includes two shoulder straps 12, 14 and a lap belt 16 as well as a negative G-strap 20.

Figure 2:
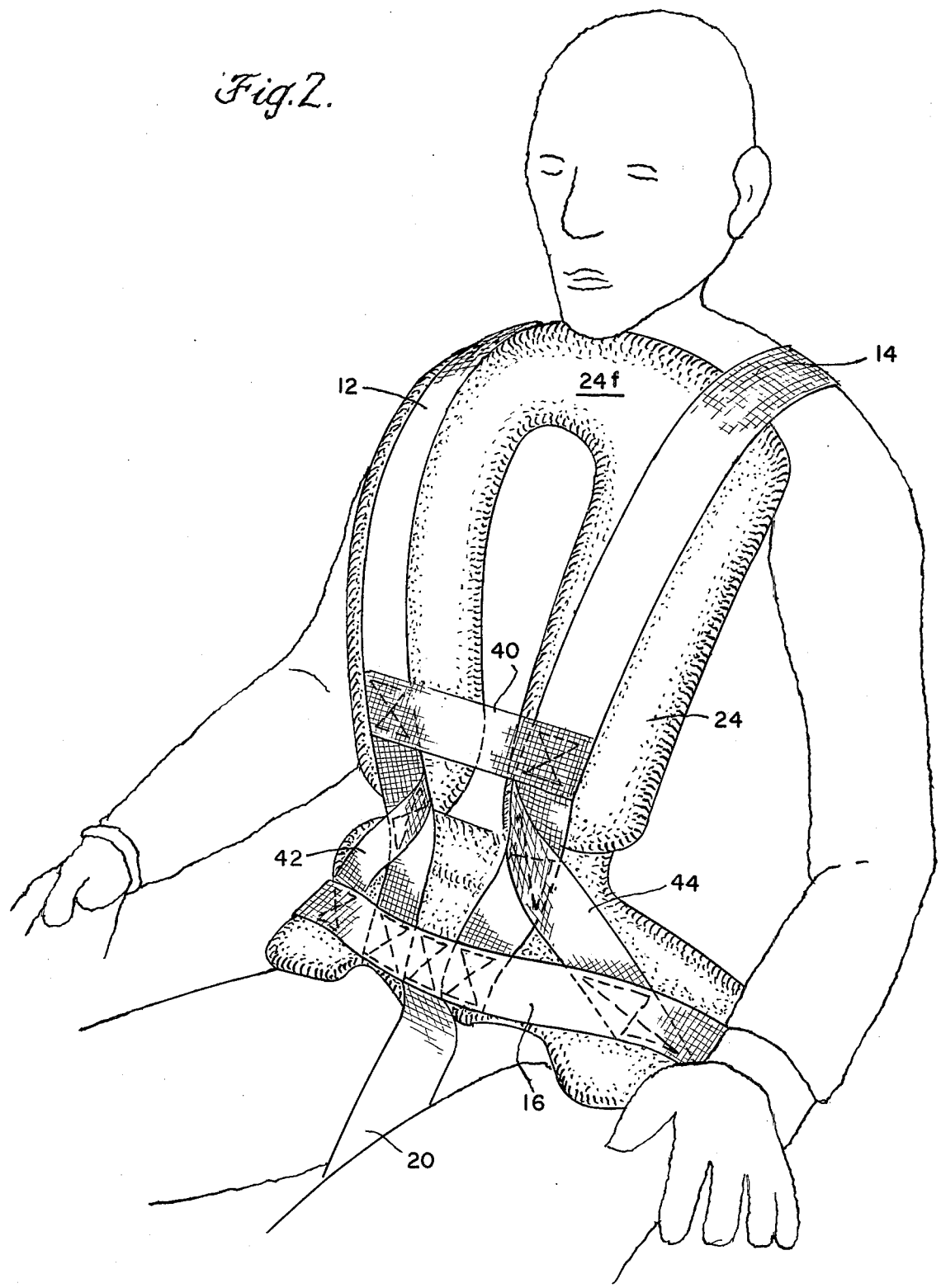
FIG. 2 shows the restraint system of FIG. 1 positioned on an aircraft crewman in an inflated state.

The shoulder straps 12 and 14, the lap belt 16, and the negative G-strap 20 are formed from conventional webbing material such as polyester, nylon, dacron or such as that set forth in Military Specification MIL-W-25361 or similar webbing specifications. The distal ends of the shoulder straps 12 and 14 are adapted to terminate in conventional inertia reels (not shown) such as those described in Military Specification MIL-R-8236. The distal ends of the lap belt 16 and the shoulder straps 12, 14 terminate into fittings 18 which mate with seat pan fittings (not shown). Both the shoulder straps 12, 14 and the lap belt 16 are provided with double loop buckles 22 which are positioned near their respective distal ends. The buckles 22 permit adjustment of the restraint system to suit the individual wearer. The proximal ends of the shoulder straps 12, 14 and the negative G-strap 20 are fixedly secured to the lap belt 16 intermediate its ends in a conventional manner such as with heavy duty stitching 17 for example. The distal end of 20a of the negative G-strap 20 is formed to be securely fastened by any suitable means to a seat as shown in FIG. 2. The negative G-strap 20 keeps the lap belt 16 properly positioned over the pelvic area and reduces submarining, i.e., the condition where the pelvic region of the body tends to slip under the lap belt 16.

The restraint system further includes an inflatable bladder member 24 to which adjoining lengths of the shoulder straps 12, 14, the lap belt 16 and the negative G-strap 20 are fixedly secured such as with adhesive. The bladder member 24 consists of two substantially identical patterns each of which take the general form shown in FIG. 1. After both patterns are cut, they are securely joined to each other along their entire perimeters so as to form the bladder member 24; the patterns may be joined by any suitable means such as heat sealing or preferably by employing one inch V-tape 25 cemented to the outer peripheral surfaces and/or the inner peripheral surfaces of the bladder member 24. Both patterns of the bladder member 24 are woven from man-made fibers such as nylon, dacron or polyester of suitable strength. Each of the patterns of the bladder structure is woven to insure relative porosity. The relative porosity of the bladder is regulated by the tightness of the weave with which the bladder member patterns are woven. One such weave is 32 × 32 rip stop. Whatever conventional material is chosen for the bladder 24, it should enable the bladder member 24 to virtually instantaneously inflate to an extended or ballooned state within 20 to 35 milliseconds and to thereafter spontaneously deflate by allowing escape of the gas through the material; in addition, the chosen conventional material and chosen weave should produce a bladder member 24 strong enough to withstand the combined forces of peak internal pressure produced by a gas generator and peak external pressure produced by the reaction of the crewman with the bladder member 24 during the initial moments of a crash.

The bladder member 24 is formed with a central pocket portion 24a which is in fluid communication with two adjoining pelvic bags 24b and 24c and two adjoining shoulder bags 24e and 24d. The shoulder bags 24e, 24d are additionally interconnected by and are in fluid communication with a chin bag member 24f. (It should be understood that the various portions of the bladder member 24 have been separately designated for convenience only and that the bladder member 24 essentially forms one continuous cavity.) The central pocket portion 24a is constructed to house a gas generator 26.

The gas generator 26 is a conventional device which is properly sized for incorporation within the bladder member 24 of the restraint system 10 of the present invention. One suitable gas generator is that manufactured by Thiokol Corporation, No. 7U-47614-03. The gas generator 26 is inserted within the central pocket portion 24a of the bladder member 24 and held in place by adhesive. A protected wire 28 extends from the igniter assembly (not shown) of the gas generator 26 through a sealed opening in the bladder member 24 and along the negative G-strap 20 to a conventional impact sensor switch 30. Upon sensing a predetermined threshold impact, the sensor switch 30 automatically closes the circuit between an aircraft power source 32 and the igniter assembly. The igniter is energized and in turn detonates the main propellant thereby causing the generation of gas which exits from the gas generator ports 26a to thereby inflate the bladder member 24. A non toxic gas, whose main component is nitrogen, is produced. The gas fills the bladder member 24 to a pressure of at least three pounds per square inch in less than 20 milliseconds after the gas generator 26 has been ignited.

FIG. 2 illustrates the restraint system 10 of the present invention in place on an aircraft crewman and in the inflated state. Optional restraining straps are shown which increase the strength of the restraint system 10. The optional additional restraining straps include a horizontal strap 40 interconnecting the shoulder straps 12, 14 and two side straps 42, 44 which respectively connect the left shoulder strap 12 with the left portion of the lap belt 16 and the right shoulder strap 14 with the right portion of the lap belt 16. It should be noted here that, in the inflated condition, the chin bag portion 24f balloons upward and fits between the crewman's chin and chest area to thereby minimize rotation of the head into the chest area.

Referring to FIG. 3 the restraint system of the present invention is shown in the uninflated and stowed condition. To present a neat and more pleasing appearance the bladder member 24 in an uninflated state may be folded over the shoulder straps 12, 14 and lap belt 16 as shown in FIG. 3 and held in place by light thread tacking or by velcro strips which respectively burst or disengage upon inflation of the bladder 24.

Operation of the restraint system 10 is as follows. When the aircraft suffers at least a threshold impact during a collision, the impact sensor switch 30 closes and provides energy from the aircraft power source 32 to the igniter assembly (not shown) of the gas generator 26 to thereby start production of gas flow through the gas generator vents 26a into the bladder member 24. Enough gas pressure and flow is generated to fully inflate the bladder member 24, as shown in FIG. 2, in less than 20 milliseconds, with a peak pressure of approximately three to six pounds per square inch. As the bladder member 24 is pressurized, the pelvic bags 24b, 24c and the chest bags 24d, 24e inflate as does the chin bag member 24f. As shown in FIG. 2, when the bladder is completely inflated it is pressed between the occupant and the restraining straps and forces the occupant back against the seat. The chin bag member 24f is wedged between the underside of the chin and the chest, to thereby prevent chin contact with the chest and minimize head rotation.

Since the bladder member 24 is relatively porous, the gas will escape through the loosely weaved synthetic material at a relatively fast rate. After approximately 250 milliseconds, the bladder member 24 will be substantially deflated but the vehicle occupant will thereafter be restrained by the shoulder straps 12, 14 and the lap belt 16.

There has been disclosed a novel and improved vehicle occupant restraint system. When the system is activated and inflated, it automatically removes any slack in the shoulder straps 12, 14 and lap belt 16, tightening around the crewman's torso to the extent that he is forcibly moved against the supporting surfaces of the seat. The chin bag portion 24f of the bladder member 24 resists the forward angular displacement of the crewman's head during impact, minimizing whiplash and restraining the mandible from striking the sternum. As the crewman moves into the inflated bladder member 24 under the impetus of his own acceleration, the restraint loads are distributed over large segments of his upper and lower torso by virtue of the large areas covered by the inflatable bladder member 24 captured between his body and the outer restraint webbing. Increased body force has the effect of flattening the bladder member 24 thereby increasing the torso area covered and further distributing crash loads. A tie down or negative G-strap 20 is used to anchor the lap belt 16 in place and reduce the probability of submarining. A distinct advantage of the restraint system of the present invention is that it does not decrease restraint protection if the bladder member 24 fails to inflate since the webbing attached to the bladder member 24 will still restrain the crewman much as present day restraint configurations do.

Obviously many modifications and variations of the present invention are permissible in light of the above teachings. It is therefore to be understood that within the scope of the appended claims the invention may be practiced otherwise than as specifically described.

What is claimed is:

1. A vehicle occupant restraint system comprising:
    an inflatable bladder member having a central pocket portion, first and second pelvic portions extending outward from said central pocket portion, first and second chest portions extending outward from said central pocket portion, and a chin bag portion interconnecting and in fluid communication with the distal ends of said first and second chest portions; and
    gas generator means positioned within said central pocket portion for producing pressurized gas upon reception of a command signal.

2. A vehicle occupant restraint system according to claim 1 further including:
    a lap belt member fixedly secured to a surface of each of said pelvic portions; and
    a shoulder strap member fixedly secured to a surface of each of said chest portions.

3. A vehicle occupant restraint system according to claim 2 further including:
    impact sensor means attached to a vehicle in which said occupant is riding and operatively connected to said gas generator means for generating said command signal when said vehicle suffers a threshold impact.

4. A vehicle occupant restraint system according to claim 3 wherein said inflatable bladder member is formed from a semi-permeable synthetic material.

* * * * *